Patented Mar. 6, 1923.

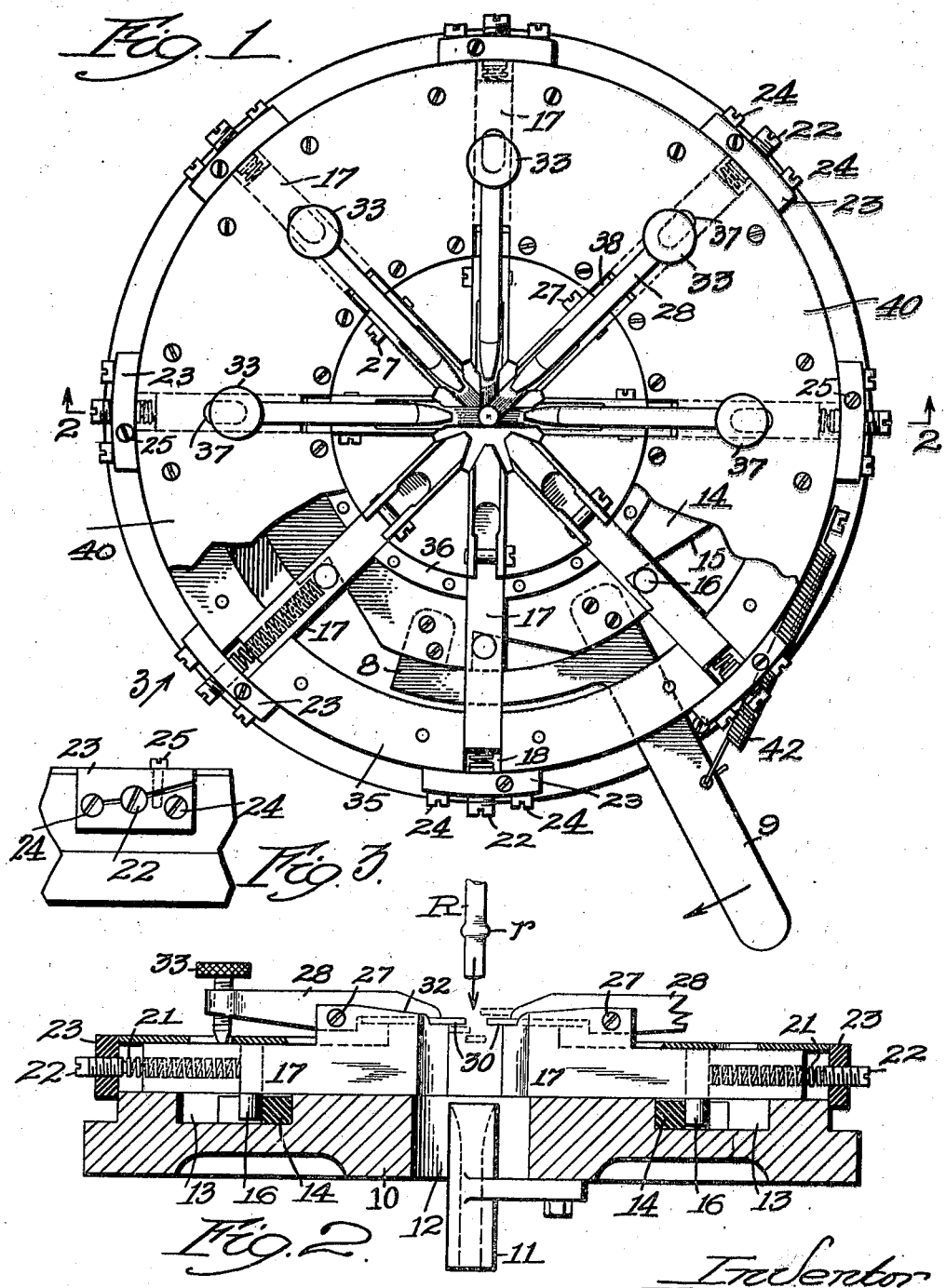

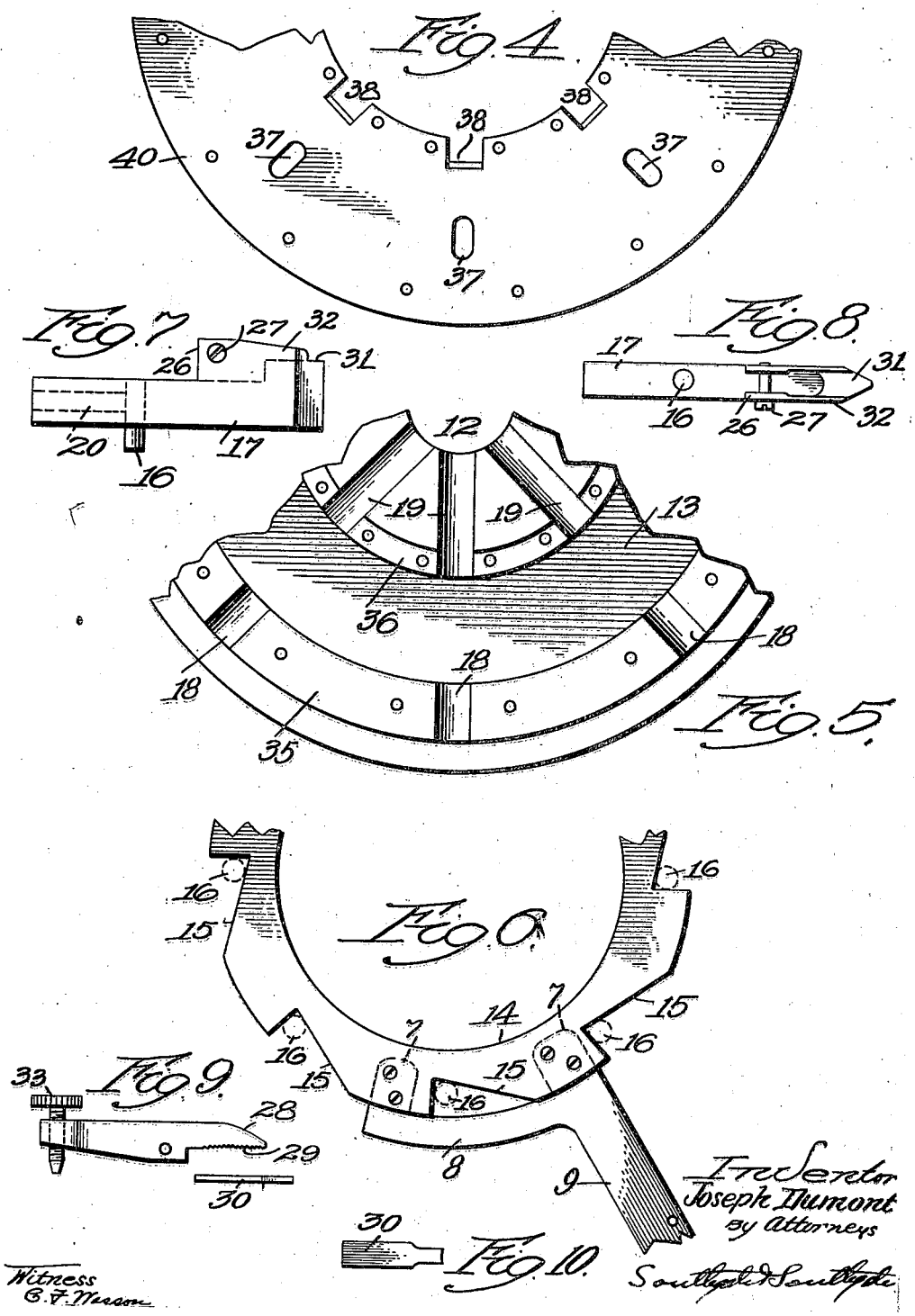

1,447,933

UNITED STATES PATENT OFFICE.

JOSEPH DUMONT, OF GARDNER, MASSACHUSETTS, ASSIGNOR TO COMMONWEALTH MANUFACTURING COMPANY, OF GARDNER, MASSACHUSETTS, A CORPORATION OF MASSACHUSETTS.

SCRAPING HEAD.

Application filed April 8, 1922. Serial No. 550,928.

*To all whom it may concern:*

Be it known that I, JOSEPH DUMONT, a citizen of the United States, residing at Gardner, in the county of Worcester and State of Massachusetts, have invented a new and useful Scraping Head, of which the following is a specification.

This invention relates to a scraping head for use on a machine for scraping the surface of rattan reeds to bring them into a true cylindrical form and to remove the hard silicious outside surface.

The principal objection of this invention is to provide a construction in which the slides for supporting the knives and the springs which hold them up to their work will be enclosed so that they will not receive upon their surfaces the waste from the outside of the reed. This waste or shavings coming from the outside surface of the reed is of a silicious character and consequently hard and injurious to the surfaces with which it comes into contact. It materially reduces the life of these parts when they are exposed to it and this invention is designed in part to protect these elements from this source of wear.

Another object of the invention is to provide means for readily applying and removing the scraping blades and of such a nature that the blades will always be left in exact position on the head.

The invention also involves other features of the device and details of construction as will appear.

Reference is to be had to the accompanying drawings, in which

Fig. 1 is a front view of a scraping head constructed in accordance with my invention;

Fig. 2 is a transverse sectional view on the line 2—2 of Fig. 1;

Fig. 3 is an elevation of the means for holding the knife adjusting devices, looking in the direction indicated by the arrow 3 in Fig. 1;

Fig. 4 is a face view of the front plate covering the head;

Fig. 5 is a face view of part of the base or support for the head;

Fig. 6 is a similar view of part of the operating cam;

Fig. 7 is a side view of the knife supporting slide;

Fig. 8 is an end view of the same;

Fig. 9 is a side view of the scraping knife and clamping jaw therefor, and

Fig. 10 is a front view of the blade itself.

This invention relates to a head adapted to be used on the kind of machine shown in the patent to Colburn, No. 221,720, patented November 18, 1879. This invention is not limited to its application to that particular machine but it is mentioned to show the use to which it is put and for that reason the rest of the machine is not illustrated herein. This head comprises a base or disc 10 adapted to be mounted in stationary position on edge and used in such a machine as I mention. It is provided with a guide 11 for receiving the reed R after it has passed through and, of course, it has a central passage 12 for the passage of the reed.

This disc has on its front face a circular groove 13 in which is located an oscillating cam 14 of the same general nature as that shown in the above mentioned patent and operating for the same purpose. The cam is centered on a circular projection 36 constituting one wall of the groove 13 and is oscillated by a handle 9 on a segment 8 secured to the cam by ears 7.

This cam has a number of slanting or cam surfaces 15 adapted to operate on studs 16 equal in number and each one located on a radial slide 17. These slides are mounted to move in radial guiding slots 18 and 19 on raised sides 35 and 36 of the groove 13 on the disc 10. Each one is provided with a cylindrical slot 20 at one end into which passes a spring 21 arranged radially and provided with a set screw 22 at its end for adjusting its tension. This spring, it will be seen, is located mainly inside the slide 17. Each screw passes through a plate 23 fastened on the edge of the disc by means of screws 24. This plate is split preferably from one of the screw holes for the screws 24 and through the center of the hole receiving the screw 22 and then at an inclination all the way to the end of the plate. This provides a slightly yielding clamp for the screw 22. When this screw is adjusted to proper position, a holding screw 25 is tightened up to hold the two jaws of the clamp together and prevent the loosening of the screw 24 and therefore any change in adjustment in the spring 21.

Each of the slides has an upwardly projecting part at 26 through which passes a pivot stud 27. On this pivot stud is pivoted a jaw 28, the operative end of which is serrated at 29 to provide teeth for clamping the scraping blade 30 down on a flat surface 31 on the slide 17. This flat surface preferably is located between two side guiding walls 32 for receiving the blade between them. At the other end the jaw is provided with an adjusting screw having a knurled head 33 which is adapted to be screwed down on the surface of the slide 17 to hold the jaw firmly down on the surface of the cutter which is clamped, as above specified. It will be observed that this gives an opportunity for clamping the scraping blade with any desired degree of firmness and yet permitting it to be relieved very promptly when desired.

On the projecting rim 35 of the disc 10 rests a cover plate 40. This covers up the passages between the slides 17 and protects all parts underneath from the shavings and waste from the reed. It is provided with slots 37 for receiving the ends of the screws 33 and with notches 38 for receiving the projecting portions 26 of the slides.

It will be noticed that the knives or blades 30 are provided as usual with concave cutting edges and that they are arranged around the center in pairs. The two knives of each pair are opposite each other and in a different plane from the knives of the other pairs. The operation of the device is the same as that described in the above mentioned patent. The cam 15 is operated by its handle 9 which is pulled over into inoperative position normally by a spring 42. This spring permits the springs 21 to hold the cutting knives all up in cutting position. The reed R in its natural form is forced in through the center and between the different pairs of knives by hand or by such a mechanism as is shown in said patent. As it goes through the knives the projections r and the entire outer surfaces are stripped off to bring the reed to uniform cylindrical shape and constant size from end to end. It passes out through the guide 11 and then can be operated on in any of the usual ways.

The product is a cylindrical reed when its exterior surfaces are scraped off. The knives are arranged to overlap each other at their edges so that the entire surface will be operated upon by them. The shavings produced are discharged in the usual way and there is no chance of their getting into the interior of the head and especially of their being deposited on the sliding surfaces of the slide 17 and its guides. The use of internal springs 21 with the covering for them inside the device prevents all possibility of the very destructive dust from the reed getting into the interior and injuring the operating surfaces.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described or to the use of the device in connection with a machine of the character shown in the Colburn patent, but what I do claim is:—

1. In a rattan scraping head, the combination with a disc having a central passage therethrough and a concentric circular groove in its face, of a series of radial slides carried on the face of said disc, means in said groove for drawing said slides back from the center, yielding means carried by the disc for forcing the slides toward the center, a cover plate for enclosing the slides and yielding means to prevent access of dust and waste thereto, said cover plate having a central opening and radial notches communicating with said opening, and means on said slides projecting through said notches for carrying scraping blades in said opening in the cover plate.

2. In a scraping head for the purpose described, the combination with a supporting disc having a passage therethrough for the stock to be treated, of a series of slides movable radially on the face of said disc, a cover plate spaced from the disc between which and the disc the slides move, means enclosed in the space between the disc and the cover plate and protected by the latter from dust and waste for moving the slides, said cover plate having a central opening into and through which the inner ends of said slides project, and means pivoted on said slides beyond the cover plate for clamping a scraping blade to the inner end of each slide.

3. In a scraping head for the purpose described, the combination of a supporting disc having a central axial passage therethrough for the stock to be treated, a series of slides radially movable thereon, each slide carrying a scraping blade at its inner end, each slide being provided with a spring extending in from its outer end, a series of slit plates located on the circumference of the disc and secured thereto, a screw extending through each plate and engaging one of said springs, for adjusting them, and means for closing the slit on the screw to hold it in adjusted position.

In testimony whereof I have hereunto affixed my signature.

JOSEPH DUMONT.